United States Patent
Matsumoto

(10) Patent No.: US 7,110,041 B2
(45) Date of Patent: Sep. 19, 2006

(54) TELETEXT DATA SEPARATION APPARATUS

(75) Inventor: Seiji Matsumoto, Hyogo (JP)

(73) Assignees: Renesas Technology Corp., Tokyo (JP); Mitsubishi Electric System LSI Design Corporation, Itami (JP)

( * ) Notice: Subject to any disclaimer, the term of this patent is extended or adjusted under 35 U.S.C. 154(b) by 642 days.

(21) Appl. No.: 10/366,398

(22) Filed: Feb. 14, 2003

(65) Prior Publication Data

US 2004/0041944 A1    Mar. 4, 2004

(30) Foreign Application Priority Data

Aug. 28, 2002   (JP)   ............................. 2002-249313

(51) Int. Cl.
*H04N 11/00*   (2006.01)
*H04N 7/00*   (2006.01)

(52) U.S. Cl. ...................................... 348/468; 348/465

(58) Field of Classification Search ............... 348/468, 348/465, 466, 467; H04N 11/00, 7/00
See application file for complete search history.

(56) References Cited

U.S. PATENT DOCUMENTS

| | | | |
|---|---|---|---|
| 4,667,235 A * | 5/1987 | Nozoe et al. ............... | 348/464 |
| 5,483,289 A * | 1/1996 | Urade et al. ................ | 348/468 |
| 5,654,764 A | 8/1997 | Suh | |
| 6,909,467 B1 * | 6/2005 | Kuzumoto et al. ......... | 348/468 |
| 6,912,009 B1 * | 6/2005 | Orii ........................... | 348/465 |

FOREIGN PATENT DOCUMENTS

| | | |
|---|---|---|
| DE | 692 23 142 T2 | 5/1998 |
| DE | 696 09 132 T2 | 3/2001 |
| EP | 0 531 549 | 3/1993 |
| JP | 2001-313912 | 11/2001 |
| WO | WO 92/22171 | 12/1992 |
| WO | WO 93/18613 | 9/1993 |

* cited by examiner

*Primary Examiner*—Trang Tran
(74) *Attorney, Agent, or Firm*—Buchanan Ingersoll & Rooney PC

(57) ABSTRACT

A teletext data separation apparatus has a slice level generating circuit including a slice timing control circuit, a control register, an adder and a divider. The slice timing control circuit generates a timing signal for sampling. The control register carries out ON/OFF control of the slice timing control circuit. The control register sets by its register value the number of the sampling points of the adder and divider. By varying the register value in response to the reception state, the number of the sampling points can be increased from the specified 16 points, for example. This makes it possible for teletext data separation apparatus to generate an appropriate slice level that enables the teletext data to be separated reliably even in conditions where noise or distortion occurs in the video signal because of the effect of a weak electric field or ghost.

16 Claims, 15 Drawing Sheets

A: NUMBER OF SAMPLINGS OF SLICE LEVEL
B: TARGET VALUE OF SLICE LEVEL
C: OFFSET FINE ADJUSTMENT VALUE

TELETEXT DATA SEPARATION APPARATUS

BACKGROUND OF THE INVENTION

1. Field of the Invention

The present invention relates to a teletext data separation apparatus for separating superimposed teletext data from a composite video signal decoded by a receiver of a television broadcast.

2. Description of Related Art

Today, the television broadcasts have spread widely throughout the world, and individual homes can enjoy video information transmitted by terrestrial broadcasting, cable broadcasting or satellite broadcasting by receiving it by TV receivers. In addition, teletext services become available which provide text information superimposed on a composite video signal of ordinary television broadcasts. The teletext services, which offer text information as well as graphics on the TV screens, provide various services according to the difference of transmission standards. For example, Japan has propagated teletext (ADAMS), the U.S. has propagated CCD (Closed Caption Decoder) and Europe and Southeast Asia have propagated TELETEXT. In any of these teletext services, a broadcasting station superimposes the teletext information on the vertical blanking period of the composite video signal, and transmits it in conjunction with the video information. Then, a receiver separates the teletext data from the received composite video signal, decodes the data and displays the decoded data on a TV screen.

Next, TELETEXT that has come into wide use in Europe will be described. FIG. 7 illustrates a state of the signal in the vertical blanking period, on which the teletext data is superimposed. The teletext data is superimposed on the sixth to 22th lines and 318th to 335th lines in the vertical blanking period. FIG. 8 illustrates some types of teletext data having a packet structure. The initial two bytes in the data region are composed of a Hamming code and include the packet number and magazine number. The Hamming code consists of eight bits, four bits of which constitute data and another four bits correction data. Thus, it can carry out 1-bit error correction and 2-bit error detection. The two items of information, the packet and magazine, are provided for specifying the use of the information of the following data, and for processing the text information or control code. In addition, the Hamming code, which is used for error correction of the data, reduces errors occurring during the transmission. The packet No. 0 is used as a header, Nos. 1–25 are used as 40×25 row display data, Nos. 26–28 are used as extended display data and navigation function data, No. 29 is used as magazine-specific information, and No. 30 is used as data for distinguishing time, recording information and the like used frequently in a VTR.

FIG. 9 is a block diagram showing a configuration of a conventional teletext data separation apparatus. In FIG. 9, the reference numeral 120 designates a RAM for storing separated teletext data (called "TEXT data" from now on); and 150 designates an A/D converter for sampling a TEXT signal superimposed on a composite video signal and for quantizing it to digital data. The reference numeral 130 designates a digital operation circuit for obtaining TEXT data from the digital data output from the A/D converter 150; and 160 designates a sync separation circuit for separating from an input video signal the vertical sync signal (called "Vsync" from now on) and a horizontal sync signal (called "Hsync" from now on). The reference numeral 170 designates a PLL (Phase Locked Loop) circuit for generating an operational clock signal of the teletext data separation apparatus; and 200 designates a slice level generating circuit for generating a slice level using a calculation result of the digital operation circuit 130. The reference numeral 250 designates a comparator for comparing the generated slice level with the TEXT data generated by the digital operation circuit 130 to restore the teletext data at the normal (transmission) mode. The reference numeral 110 designates a control register for controlling the ON/OFF operation of a slice timing control circuit 140 (FIG. 14) in the slice level generating circuit 200. The slice timing control circuit 140 is connected via a bus 108 to a CPU (Central Processing Unit) for carrying out various types of processing in the receiver according to software, and is supplied with control signals for controlling writing and reading.

Next, the basic operation of the conventional teletext data separation apparatus will be described.

The composite video signal, on which the TEXT data as shown in FIG. 10 is superimposed, is input to the A/D converter 150 and sync separation circuit 160. The sync separation circuit 160 separates the horizontal sync signal Hsync and the vertical sync signal Vsync from the composite video signal, and outputs them after shaping. The PLL circuit 170 operates in response to the generated Hsync used as a reference clock signal in such a manner that it locks to the Hsync, thereby generating the operational clock signal (called "VCO clock" from now on) of the teletext data separation apparatus. The slice timing control circuit 140 (FIG. 14) controls the following slicing operation in response to the generated Vsync, Hsync and VCO clock.

The A/D converter 150 samples the TEXT signal superimposed on the incoming composite video signal. FIG. 11 illustrates a example of the sampling within a single bit width of the data. The sampling timings are designated by t1, t2, t3 and t4, and the sampled values at the sampling timings are designated by X1, X2, X3 and X4.

FIG. 12 is a schematic diagram illustrating the sampling and operation process of the digital operation circuit 130. In FIG. 12, reference numerals 151–159 each designate a latch circuit, 132 and 134 each designate an adder, and the reference numeral 133 designates an integrator.

Reference symbols N−4–N+4 each designate a sampling point. The sampling points N−4–N−1 are converted to the digital data in each bit width at the timings t01, t02, t03 and t04. The following bit is sampled at the timings t05, t06, t07 and t08. Thus, the sampling is carried out continuously.

Subsequently, the results of the sampling and A/D conversion are stored into the latch circuits 151–159 sequentially in FIG. 12. For example, when the sampling point N−4 is stored in the latch circuit 159, the sampling point N−3 is stored into the latch circuit 158, N−2 into the latch circuit 157, N−1 into the latch circuit 156, N into the latch circuit 155, N+1 into the latch circuit 154, N+2 into the latch circuit 153, N+3 into the latch circuit 152, and N+4 into the latch circuit 151.

These sampled values are latched so that the value of the sampling point N is obtained not from the value $X_n$ latched in the latch circuit 155, but from the value corrected using its neighboring sampled values latched. The value $X_n$ takes "0" or "1" finally.

The conventional digital operation circuit 130 uses the adders 132 and 134 and the integrator 133 to obtain the corrected value $F(X_n)$ of the latched value $X_n$ according to the following equation.

$$F(X_n) = aX_n + bX_{n-4} + cX_{n+4} + d$$
$$= aX_n - X_{n-4} - X_{n+4}$$

where, b=c=−1 and d=0. The constant a is set in a part of the control register 110.

The comparator 250 compares the corrected value $F(X_n)$ with a predetermined slice level so that the value $X_n$ takes a value "0" or "1". A value corresponding to the operation corrected result $F(X_n)$ is supplied to a first adder 210 (FIG. 14) of the slice level generating circuit 200.

FIG. 13 is a timing chart illustrating waveforms of the actual operation of the teletext data separation apparatus. The waveform (b) is a result of the separation when the video signal (a) is input. It is converted into binary data "0" and "1" bit by bit in response to the sampling clock (c), and the binary data is stored into the RAM 120 operating as a buffer. A slice level $A_0$ is generated by averaging the 16 sampled values a1–a16 in the clock run-in portion as illustrated in FIG. 10. It is also possible to add an offset $C_0$ according to the register value of the control register 110.

$$A_0 = \{(a1+a2+a3+ \ldots +a15+a16)+C_0\}/16$$

FIG. 14 is a block diagram showing a configuration of the conventional teletext data separation apparatus, in which the slice level generating circuit 200 of FIG. 9 is shown in more detail. In FIG. 14, the reference numeral 140 designates a slice timing control circuit for controlling the timing of the entire separating operation of the teletext data separation apparatus. The reference numeral 210 designates a first adder, 220 designates a divider, 230 designates a second adder and 240 designates an offset register.

The conventional apparatus uses 16 sampling points for generating the slice level. In this case, the calculation result F(a) by the first adder 210 is given by the following expression.

$$F(a) = a1+a2+ \ldots +a15+a16$$

where ai (i=1–16) designate the sampling points. The operation of the divider 220 is given by the following expression.

$$G(x) = x/16 = F(a)/16$$

where x is the sum output from the first adder 210.

Here, the offset register 240 is used for setting the offset value to the slice level. The offset value of the offset register 240 is set using software, a procedure of which is illustrated in FIG. 15. In FIG. 15, the data about the slice level is input and stored (step ST51). Then the software makes a decision as to whether the number of the data equals a specified sampling number A or not (step ST52). If the sampling number reaches the specified number A, the software calculates the average value Y (step ST53). Subsequently, the software makes a decision as to whether the average value Y is greater than the target value B of the slice level (step ST54). If it is greater, the software subtracts the fine adjustment value C from the offset value (step ST55), whereas it is smaller, the software adds the fine adjustment value C, thereby completing the processing (step ST56). Then, the software returns to the storing operation of the next data about the slice level (from step ST57 to ST51).

With the foregoing configuration, the conventional teletext data separation apparatus has the following problems.

The number of the sampling points for generating the slice level is fixed at 16 points. Although an increasing number of the sampling points will be able to improve the slice characteristic, it will increase the current consumption or spurious emission of the processing circuit. Considering these merit and demerit, the number of the specified points is determined at 16 points. However, generating the slice level from the 16-point sampled data for separating the teletext data has the following problems. First, it cannot achieve an appropriate level when the reception is made under a bad condition such as a weak electric field or ghost.

Second, although the conventional circuit generates the slice level during the initial two clock pulses of the clock run-in signal of FIG. 10, it has a problem in that it cannot generate a satisfactory slice level in a bad condition. This is because the number of clock pulses of the clock run-in signal can vary from that of the normal case, or it can become an irregular signal with insufficient peak value or waveform.

Third, it has a problem in that the volume of software grows heavier with the processing speed because of the following reason. To set the offset value of the offset register 240, the state of the irregular signal must be fed back quickly. Although the conventional circuit carries out the feedback processing by software, the processing time of the feedback depends on the clock frequency of a microcomputer. Accordingly, the volume of the software grows heavier with the speed of the feedback processing required.

Moreover, the conventional circuit as shown in FIG. 14 uses the sampled data output from the A/D converter 150 to generate the slice level. However, when the microcomputer operates, its noise is usually superimposed on its power, which offers a problem of having an adverse effect on the power supply of the A/D converter 150, thereby degrading its conversion accuracy.

SUMMARY OF THE INVENTION

The present invention is implemented to solve the foregoing problems. It is therefore an object of the present invention to provide a teletext data separation apparatus capable of generating an appropriate slice level enabling the reliable separation of the teletext data even when the video signal suffers from noise or distortion because of the adverse effect of the weak electric field, ghost or the like.

Another object of the present invention is to provide a teletext data separation apparatus capable of generating an appropriate slice level by improving the conversion accuracy of the A/D converter for sampling the teletext data by reducing the adverse effect of the noise of the power supply.

Still another object of the present invention is to provide a teletext data separation apparatus capable of generating an appropriate slice level by increasing the flexibility in separating the digital data, which is obtained by sampling the teletext data, and required for generating the slice level.

According to one aspect of the present invention, there is provided a teletext data separation apparatus including a register for setting by its register value the number of sampling points of an adder and a divider for determining the slice level; and means for varying the register value of the register in response to a reception state to increase the predetermined number of the sampling points (16 points). Thus, it offers an advantage of being able to optimize the slice level for separating the teletext data even if the reception conditions of the composite video signal fall into bad conditions such as weak electric field or ghost.

DETAILED DESCRIPTION OF THE PREFERRED EMBODIMENTS

The invention will now be described with reference to the accompanying drawings.

Embodiment 1

Figure 1:
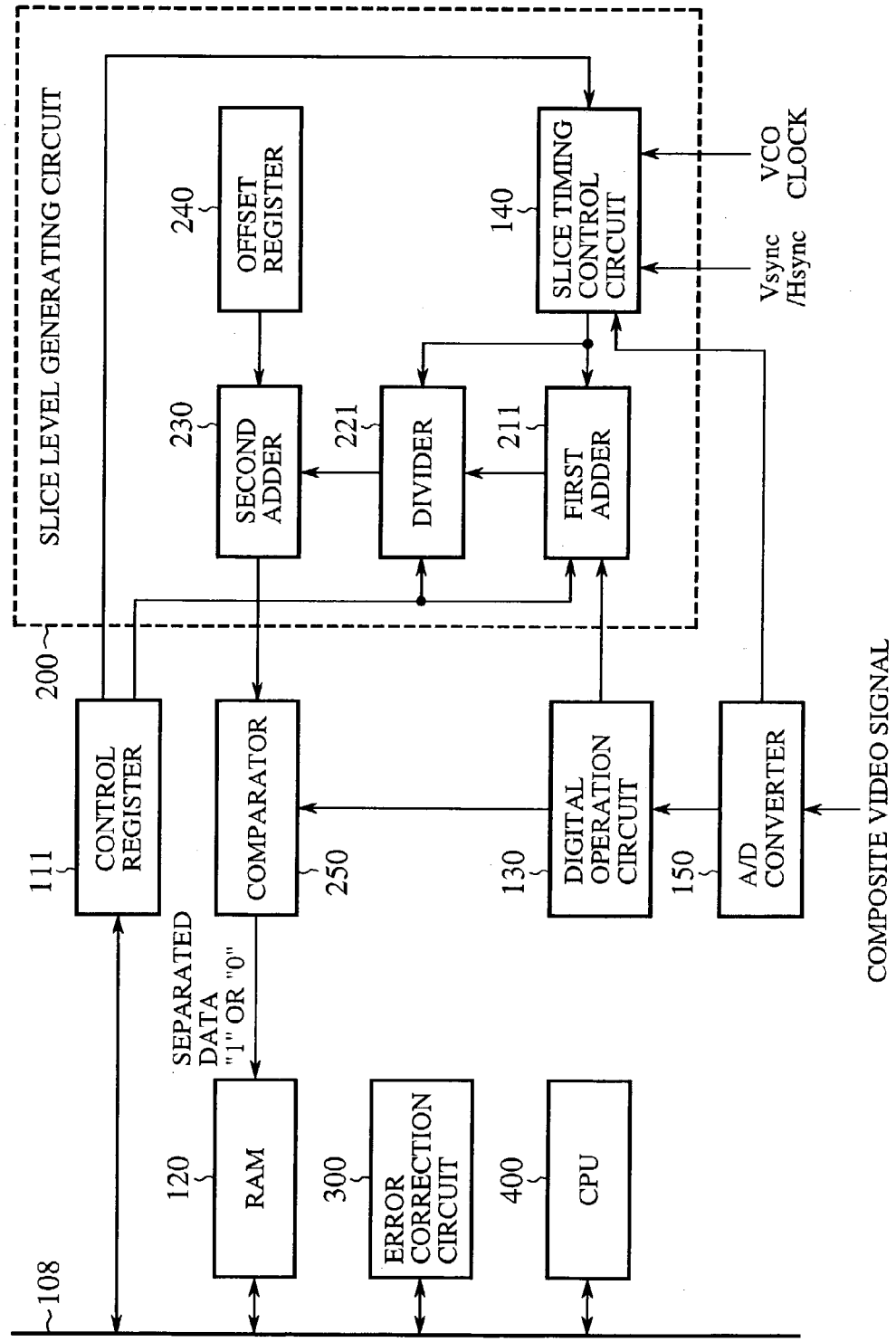
FIG. 1 is a block diagram showing a configuration of an embodiment 1 of the teletext data separation apparatus in accordance with the present invention.

FIG. 1 is a block diagram showing a configuration of an embodiment 1 of the teletext data separation apparatus in accordance with the present invention. In FIG. 1 the same reference numerals as those of FIG. 14 designate the same portions, and the description thereof is omitted as a rule. In FIG. 1, the reference numeral 111 designates a control register, 211 designates a first adder, 221 designates a divider, 300 designates an error correction circuit, and 400 designates a CPU.

As described before, the conventional circuit uses 16 sampling points to generate the slice level. In contrast with this, the present embodiment 1 generates the slice level as follows.

The control register 111 includes bits for changing the number of the sampling points. The RAM 120 stores the slice data that includes a Hamming code or parity bits for the error correction. The slice data is once read by the CPU 400 via a bus 108, and undergoes the identification of the data, the parity check, and the error detection and correction by the error correction circuit 300. The errors reflect the reception state. Accordingly, monitoring the errors continuously, the CPU 400 switches the bits for changing the number of the sampling points of the control register 111 when the reception state falls into such a state as the error exceeds a predetermined threshold value, that is, if the effect of the weak electric field or ghost becomes conspicuous. When the register value is varied, the first adder 211 and divider 221 increase the number of the sampling points from the specified 16 points.

When the number of the sampling points is doubled, for example, operation equations of the first adder 211 and divider 221 $F(a)'$ and $G(x')'$ are given by the following expressions.

$$F(a)'=a1+a2+\ldots+a15+a16+\ldots+a31+a32$$

$$G(x')'=x'/32=F(a)'/32$$

where $x'$ is the calculation result of the first adder 211.

As a result, the present embodiment 1 can suppress the variation in the slice level. Although the number of the sampling points is doubled here, the operation equations can be established for various values.

As described above, the embodiment 1 is configured such that the control register 111, which carries out the ON/OFF control of the operation of the slice timing control circuit 140, increases the number of the sampling points from the conventionally specified 16 points by detecting the reception state. Thus, the present embodiment 1 offers an advantage of being able to optimize the slice level for separating the teletext data, even if reception conditions of the composite video signal vary in the bad conditions such as the weak electric field or ghost.

Embodiment 2

Figure 2:
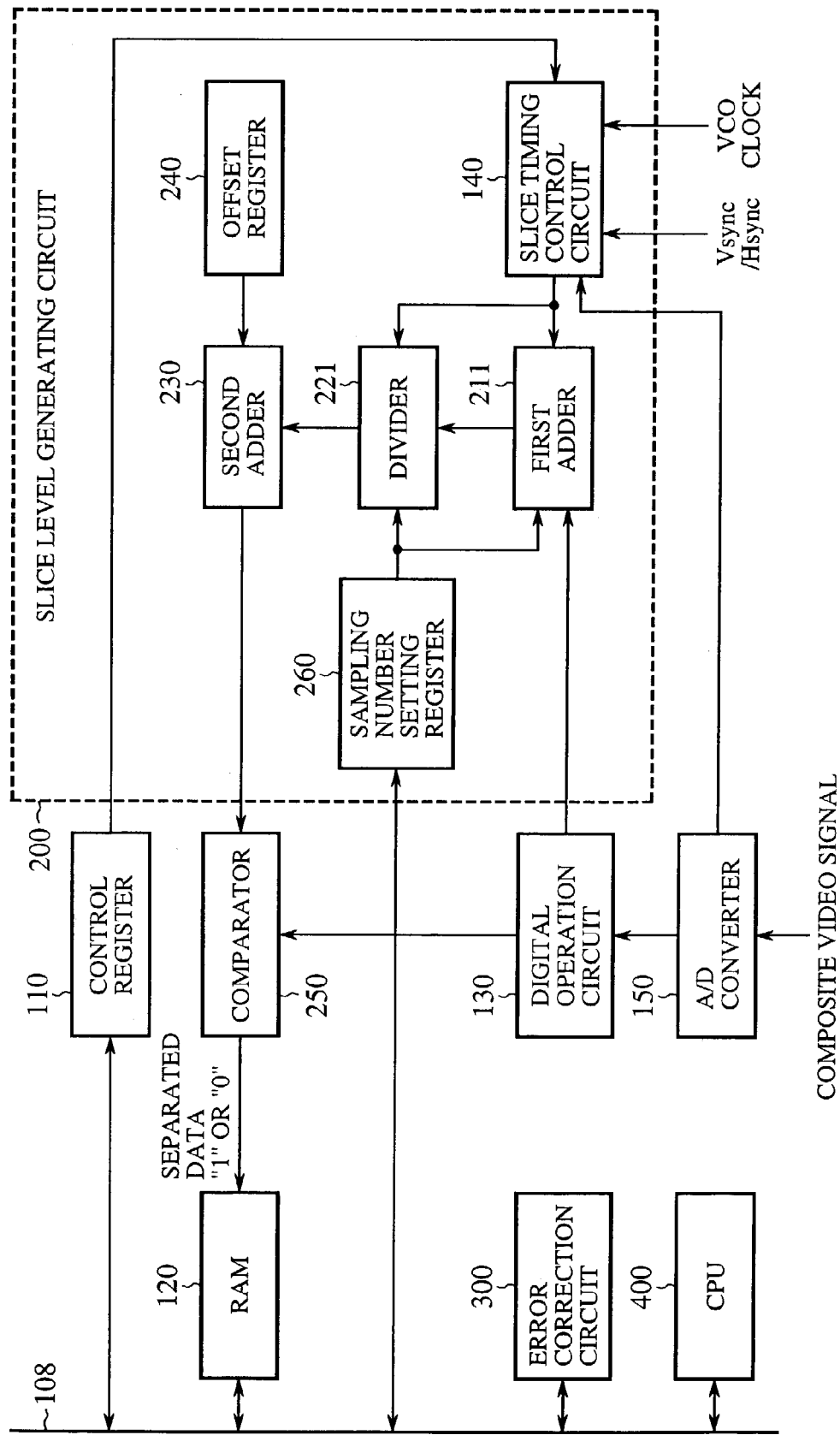
FIG. 2 is a block diagram showing a configuration of an embodiment 2 of the teletext data separation apparatus in accordance with the present invention.

FIG. 2 is a block diagram showing a configuration of an embodiment 2 of the teletext data separation apparatus in accordance with the present invention. In FIG. 2, the same or like portions to those of FIG. 1 are designated by the same reference numerals, and the description thereof is omitted as a rule. The reference numeral 110 designates a control register, and 260 designates a sampling number setting register for setting the number of the sampling points of the first adder 211 and divider 221.

The present embodiment 2 includes the sampling number setting register 260 to control the operation of the first adder 211 and divider 221 so that the number of the sampling points can be varied in response to the reception state as described in the foregoing embodiment 1. Thus, the general operation equations of the first adder 211 and divider 221 are given by the following equations.

$$F(a)'=a1+a2+\ldots+an$$

$$G(x')'=x'/n$$

where n is the value set by the sampling number setting register 260, and $x'$ is the output of the first adder 211. The sampling number setting register 260 can set the number of the sampling points for determining the slice level not only at 32 points, but also at any desired value in accordance with various conditions.

As described above, the present embodiment 2 is configured such that it includes the sampling number setting register 260 for setting the number of the sampling points of the adder 211 and divider 221 so that the number of the sampling points can be varied in response to the reception state. Thus, the present embodiment 2 can increase the number of the sampling points from the specified points when the degradation of the reception is detected. As a result, it offers an advantage of being able to optimize the slice level for separating the teletext data even if the reception condition of the composite video signal varies. In addition, since the sampling number setting register 260 is rewritable by software, the present embodiment 2 offers an advantage of being able to increase the flexibility in setting the number of the sampling points, thereby facilitating its change.

Embodiment 3

Figure 3:
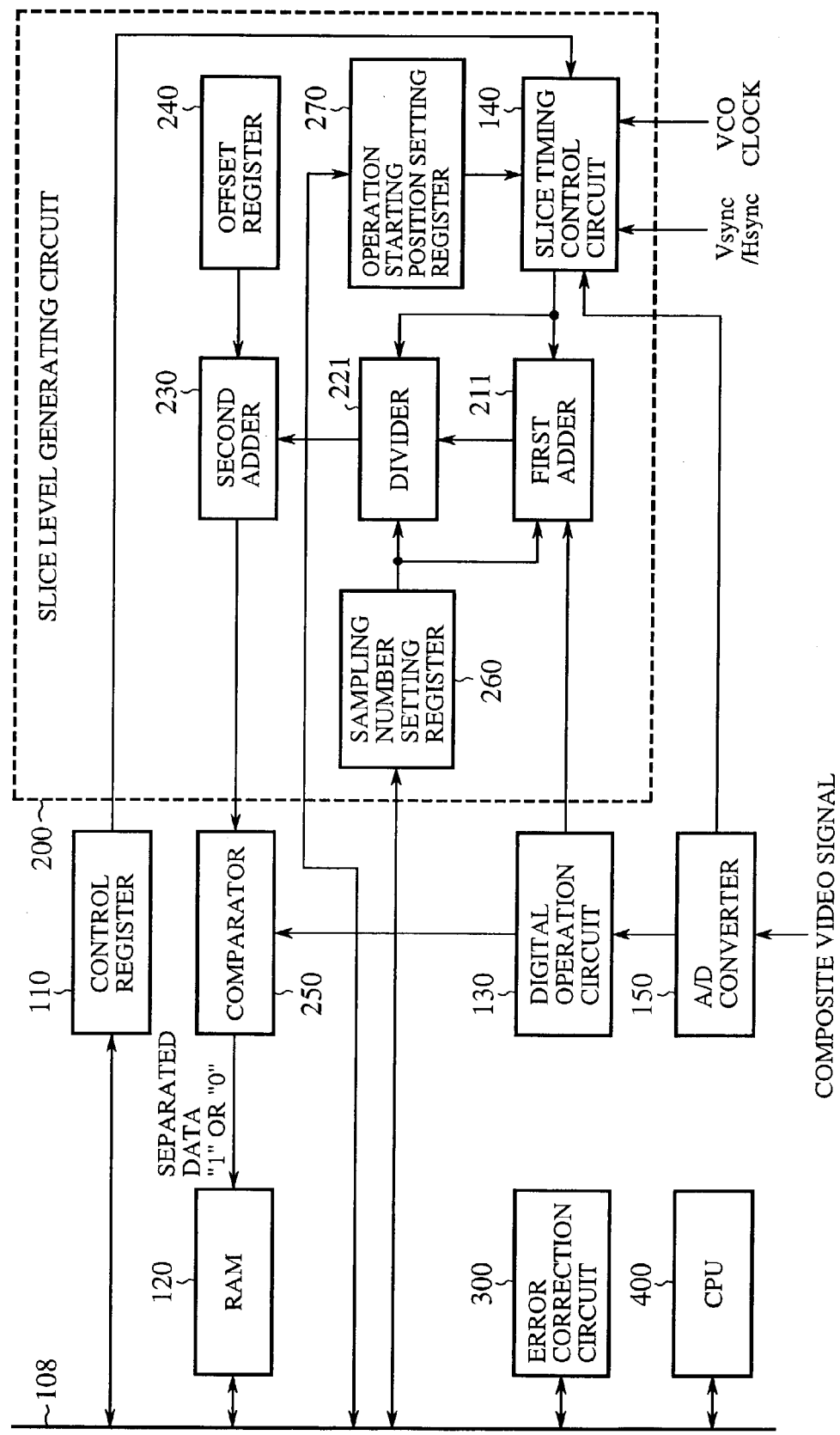
FIG. 3 is a block diagram showing a configuration of an embodiment 3 of the teletext data separation apparatus in accordance with the present invention.

FIG. 3 is a block diagram showing a configuration of an embodiment 3 of the teletext data separation apparatus in accordance with the present invention. In FIG. 3, the same or like portions to those of FIG. 2 are designated by the same reference numerals, and the description thereof is omitted as a rule. In FIG. 3, the reference numeral 270 designates an operation starting position setting register.

In the bad reception conditions, the number of the clock pulses can vary, and an irregular signal with insufficient peak value or waveform can occur. Since the positions of the sampling points for the slice level are located in the initial two clock pulse portion of the clock run-in signal, the irregular waveform lacking this portion will disable the generation of the appropriate slice level. Considering this, the present embodiment 3 carries out the following operation.

The operation starting position setting register 270 instructs the slice timing control circuit 140, which supplies the first adder 211 and divider 221 with the timing signal for carrying out the slice, to vary the start timing of generating the slice level in response to the reception state. Specifically, using software, the operation starting position setting register 270 varies the timing of generating the slice level in the following manner. When the initial two clock pulse portion of the clock run-in signal has an irregular waveform, the generation of the timing signal is delayed in order to start generating the slice level from another location of the clock signal. This makes it possible to generate an accurate slice level in spite of the irregular clock run-in waveform.

As described above, the present embodiment 3 is configured such that it includes the operation starting position setting register 270 for controlling the slice timing control circuit 140 to vary the start timing of the slice level generation in response to the reception state. Thus, the present embodiment 3 offers an advantage of being able to generate the appropriate slice level even if the irregular waveform is present at the initial position of the clock run-in signal.

Embodiment 4

Figure 4:
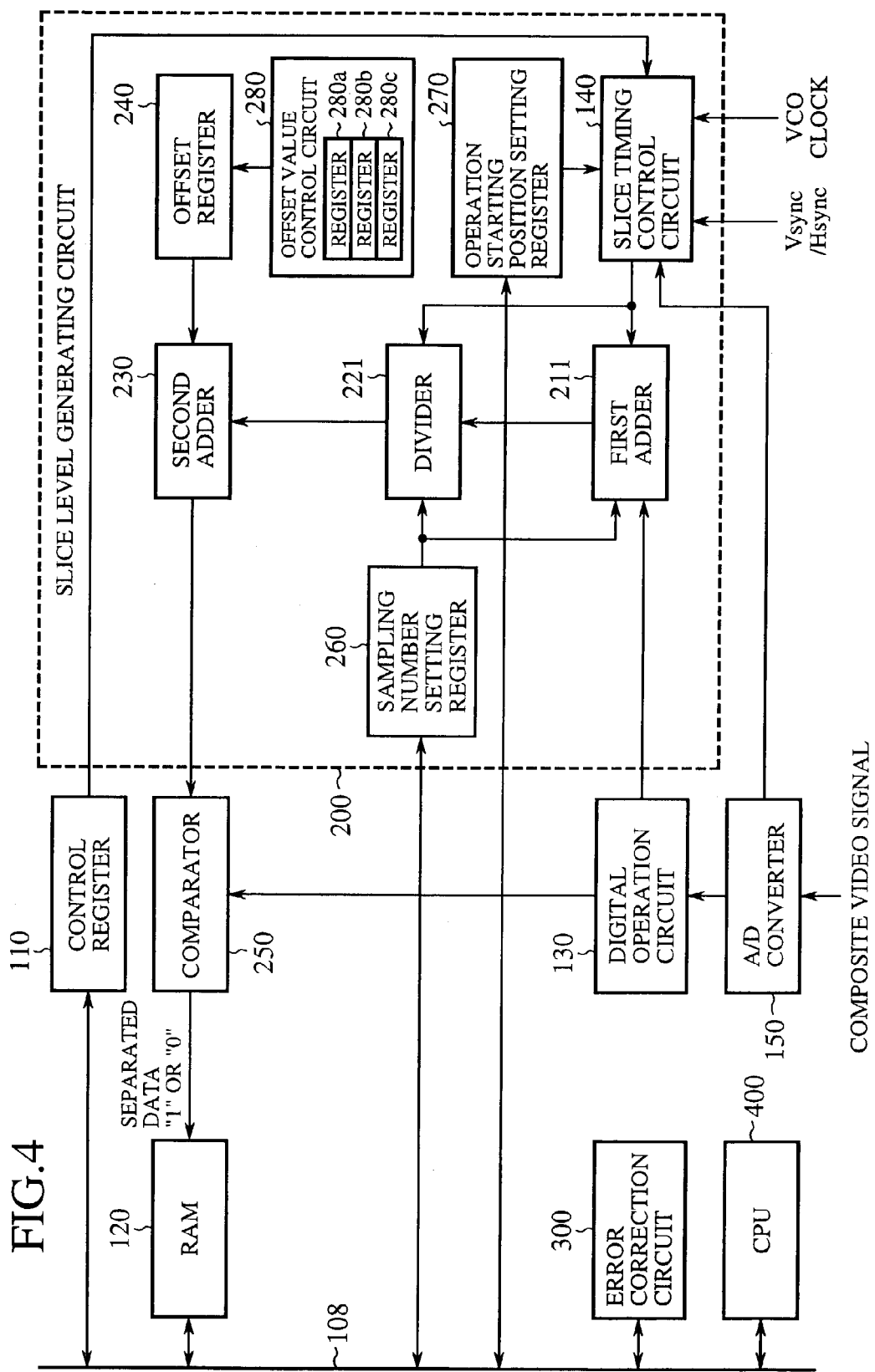
FIG. 4 is a block diagram showing a configuration of embodiments 4 and 5 of the teletext data separation apparatus in accordance with the present invention.

FIG. 4 is a block diagram showing a configuration of embodiments 4 and 5 of the teletext data separation apparatus in accordance with the present invention. In FIG. 4, the same or like portions to those of FIG. 3 are designated by the same reference numerals, and the description thereof is omitted as a rule. In FIG. 4, the reference numeral 280 designates an offset value control circuit for automatically correcting the specified offset value of the offset register 240. The offset value control circuit 280 includes registers 280a–280c, which will be described later. The present embodiment 4 sets the offset value of the slice level not by the software as the conventional apparatus, but by the hardware, that is, by the offset value control circuit 280.

Figure 15:
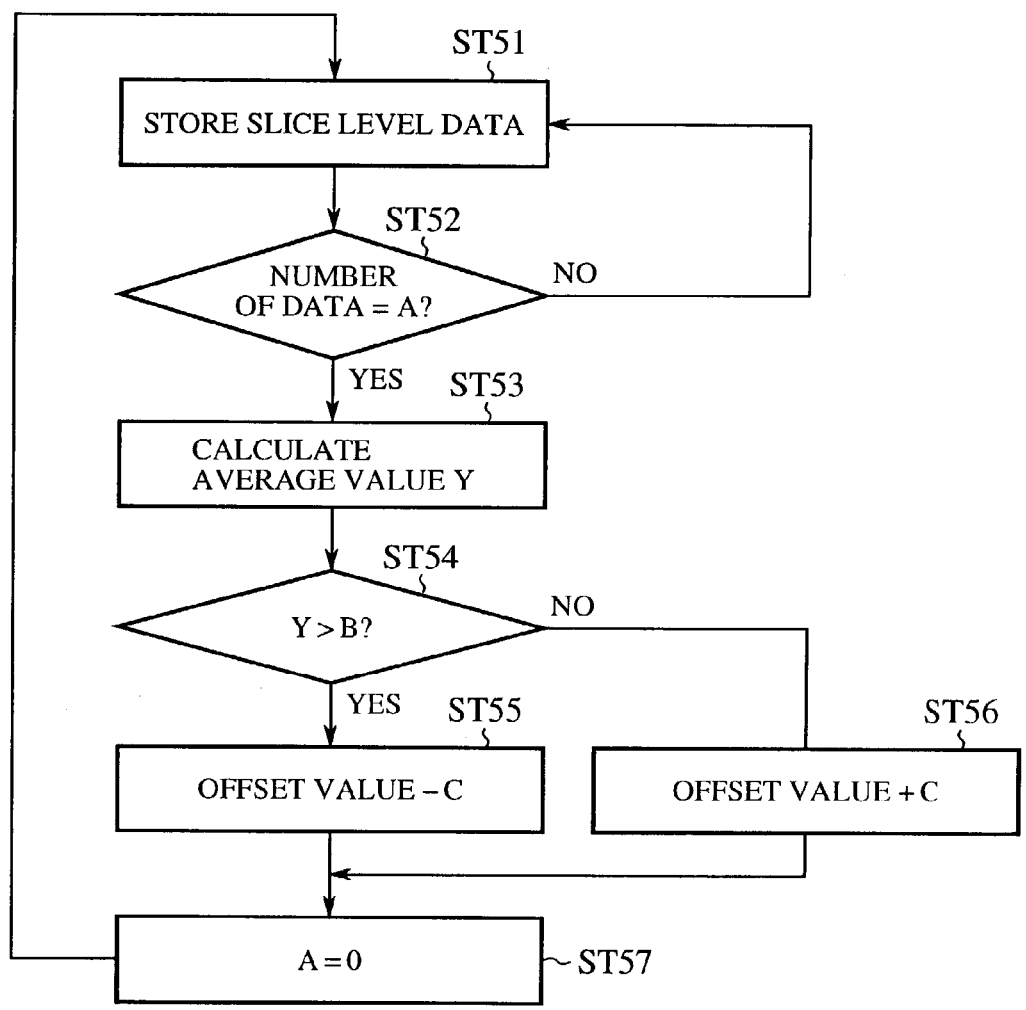
FIG. 15 is a flowchart illustrating the update procedure of the offset value associated with the embodiment 4.

The offset value control circuit 280 varies the offset value in the same procedure as the conventional apparatus as illustrated in FIG. 15.

More specifically, the data about the slice level are stored until the number of the data reaches the sampling number A. Then, the offset value control circuit 280 computes the average value Y, and compares the computed result with the predetermined target value B of the slice level. According to the compared result, the offset value control circuit 280 increases or decreases the offset value by the offset fine adjustment value C to obtain an ideal offset value. Repeating the operation, the offset value control circuit 280 can change the slice level automatically even if the conditions of the incoming composite video signal vary because of the weak electric field or ghost. Thus, the set value of the offset register 240 can be automatically rewritten by the hardware in response to the conditions of the composite video signal rather than by the software.

As described above, the present embodiment 4 is configured such that the offset value control circuit 280 automatically rewrites the specified offset value of the offset register 240, which is set at the slice level in response to the sampling points Thus, the present embodiment 4 rewrites the slice level by the hardware rather than by the software. As a result, it offers an advantage of being able to handle the high-speed feedback even in the irregular signal condition, thereby making it possible to prevent the increase in the volume of the software.

Embodiment 5

Although the sampling number A, the target value B of the slice level and the offset fine adjustment value C are fixed in the foregoing embodiment 4, the embodiment 5 makes them variable by the CPU 400 using the registers 280a–280c for storing them. As a result, the present embodiment 5 can vary the offset value, and hence can adjust the offset value to the appropriate slice level in response to the sampled conditions.

As described above, the present embodiment 5 is configured such that it includes the register 280a for variably setting the sampling number A associated with the slice level, the register 280b for variably setting the target value B of the slice level and the register 280c for variably setting the offset fine adjustment value C, which are used for the automatic correction of the offset value, and for setting the variable offset value instead of the specified offset value. As a result, the present embodiment 5 offers an advantage of being able to set the offset value flexibly for generating the appropriate slice level in accordance with the sampled conditions.

Embodiment 6

Figure 5:
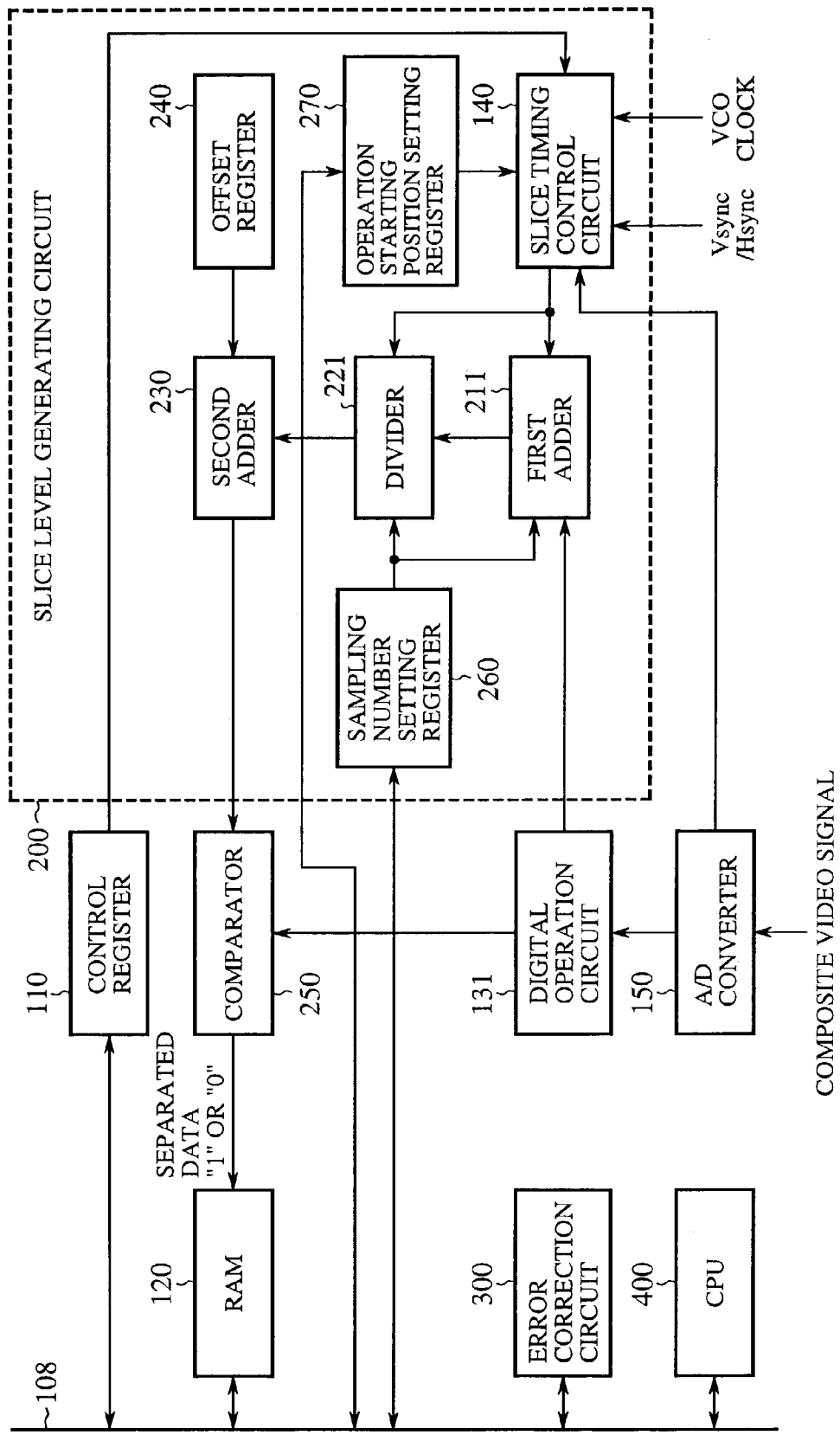
FIG. 5 is a block diagram showing a configuration of an embodiment 6 of the teletext data separation apparatus in accordance with the present invention.

FIG. 5 is a block diagram showing a configuration of an embodiment 6 of the teletext data separation apparatus in accordance with the present invention. In FIG. 5, the same or like portions to those of FIG. 3 are designated by the same reference numerals, and the description thereof is omitted as a rule. In FIG. 5, the reference numeral 131 designates a digital operation circuit used in place of the digital operation circuit 130 as shown in FIGS. 1–4.

Figure 14:
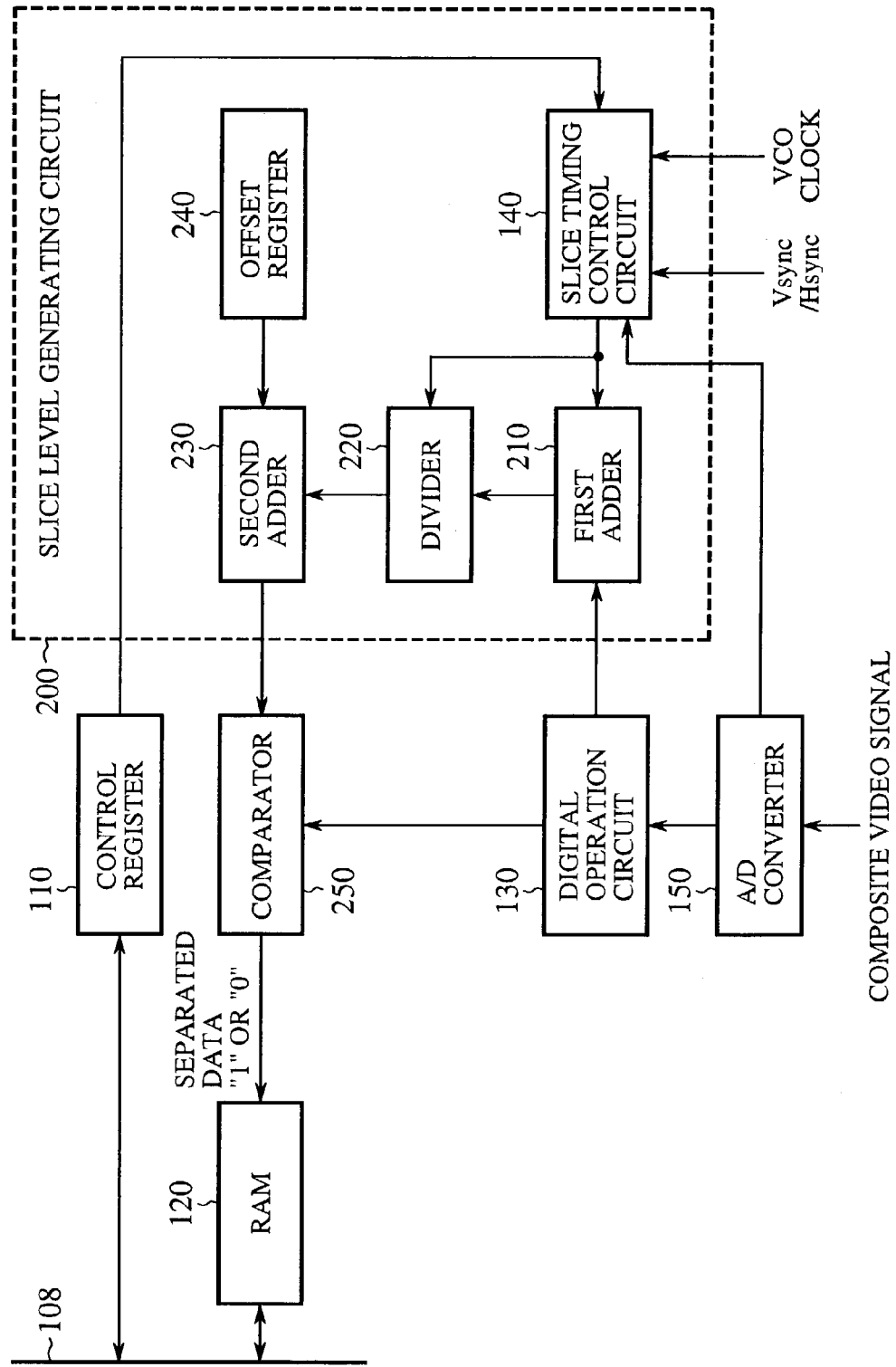
FIG. 14 is a block diagram showing a detailed configuration of a part of the conventional teletext data separation apparatus.

In the conventional circuit as shown in FIG. 14, the calculation result output from the digital operation circuit 130, that is, the data corresponding to the operation corrected result $F(X_n)$, is supplied to the first adder 210. However, if the A/D converter 150 does not provide a desired sampled result, the signal supplied to the first adder 210 can be selected from the following data other than the $F(X_n)$, for example.

(1) A plurality of A/D conversion results before the operation correction (the output of the A/D converter 150).

Figure 12:
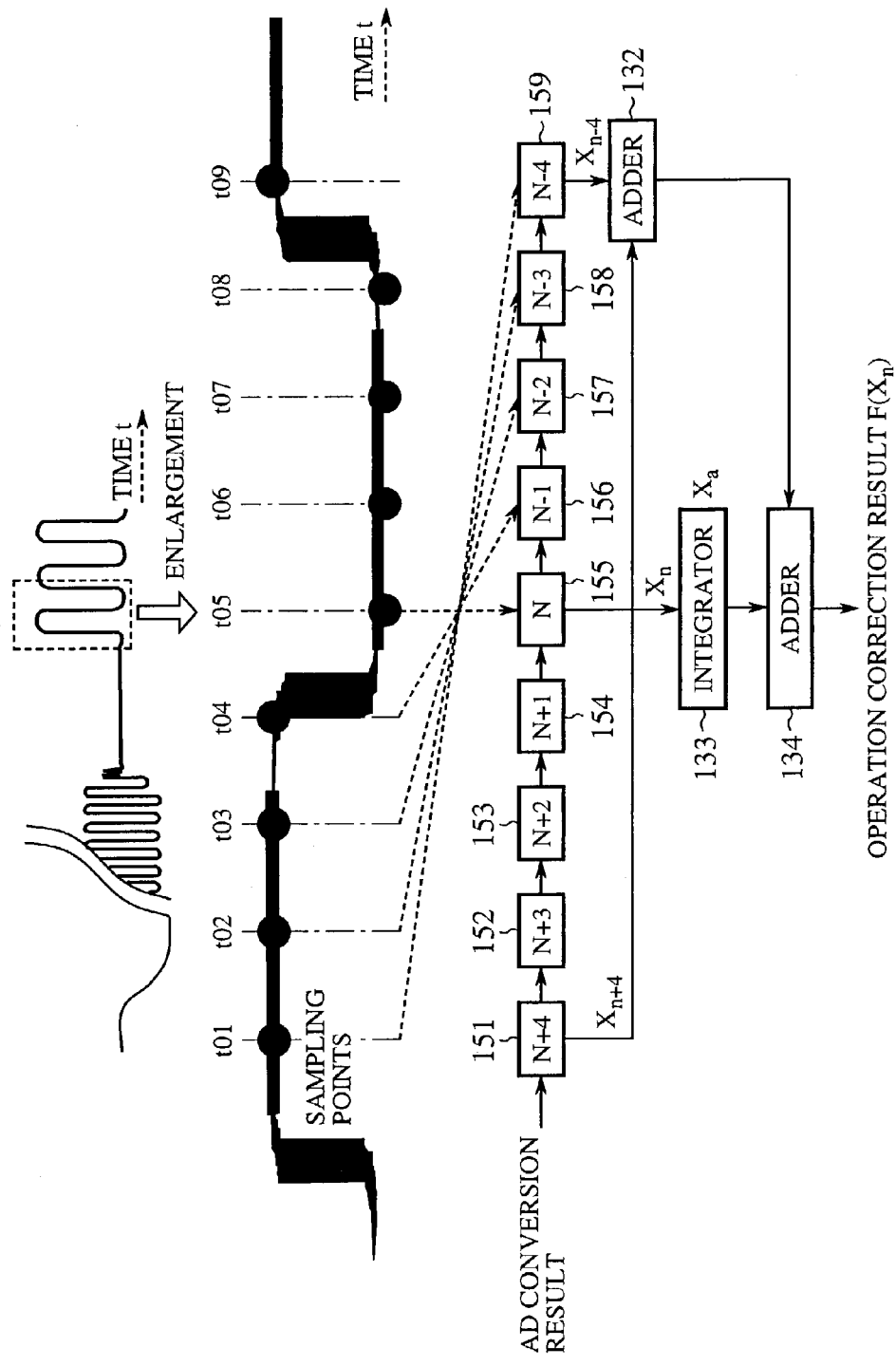
FIG. 12 is a schematic diagram illustrating the sampling of the conventional teletext data separation apparatus and the operation process of its digital operation circuit.
Figure 13:
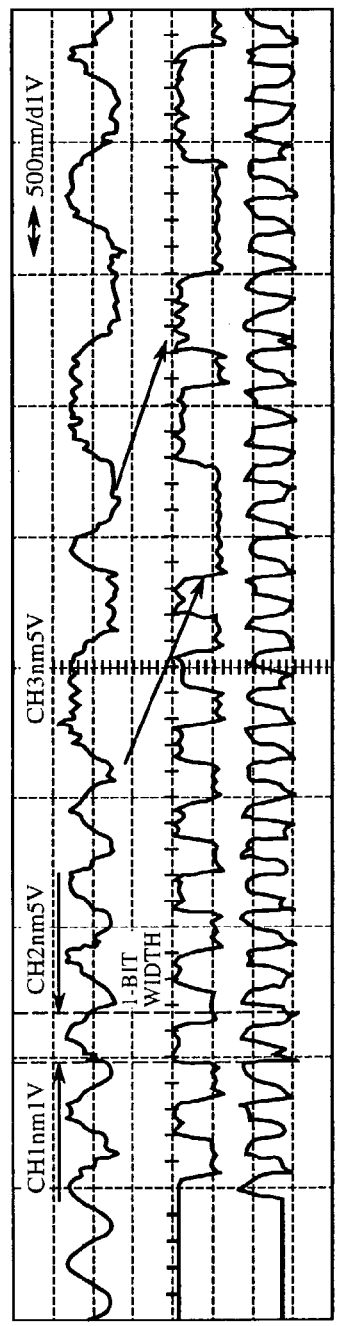
FIG. 13 is a timing chart illustrating waveforms of the actual operation of the teletext data separation apparatus.

(2) Another calculation result of the operation correction circuit 130 (the output of the integrator 133 of FIG. 12).

(3) The output of the digital operation circuit 131 that carries out the operation in a manner different from the correction operation of the conventional circuit.

In the case (1), multiple digital data directly output from the A/D converter 150 are used to obtain more positive sampled result. In the case (2), two sets of sampled values with their timing being shifted are used to increase the seeming sampling number, thereby complementing the sampled values with each other. In the case (3), the sampling is carried out on the sixth line and 12th line, for example, and one of them is selected which will enable the normal decision of the slice level used for the slicing operation. The digital operation circuit 131 of FIG. 5 corresponds to the case (3).

As described above, the present embodiment 6 is configured such that it utilizes for generating the slice level the digital data directly output from the A/D converter 150 or the digital data obtained in the digital operation circuit 131 (which differs from the digital data output from the conventional digital operation circuit 130) rather than the digital data conventionally used for generating the slice level. Thus, the present embodiment 6 offers an advantage of being able to increase the flexibility in the design.

Embodiment 7

In the conventional circuit configuration of FIG. 14 and the circuit configurations of FIGS. 1–4, the output from the single A/D converter 150, that is, the sampled teletext data, is supplied to the digital operation circuit 130 and is used for generating the slice level, as well. However, when operating the microcomputer to generate the slice level, it is usual that noise is superimposed on the power supply of the microcomputer itself, and the power supply of the A/D converter 150 also suffers from the noise. This will degrade the conversion accuracy of the A/D conversion. The present embodiment 7 handles the problem.

Figure 6:
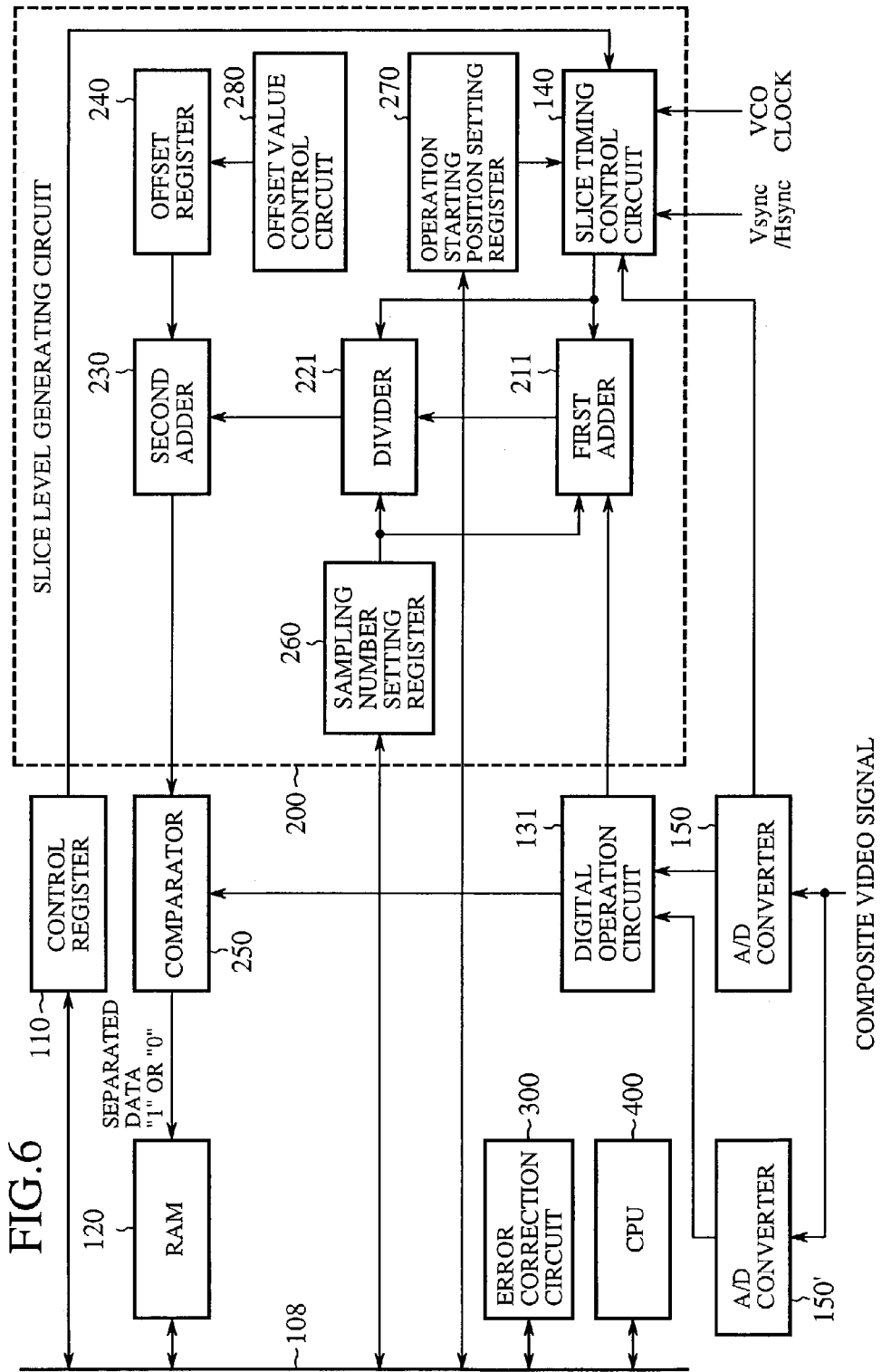
FIG. 6 is a block diagram showing a configuration of embodiments 7 and 8 of the teletext data separation apparatus in accordance with the present invention.
Figure 7:
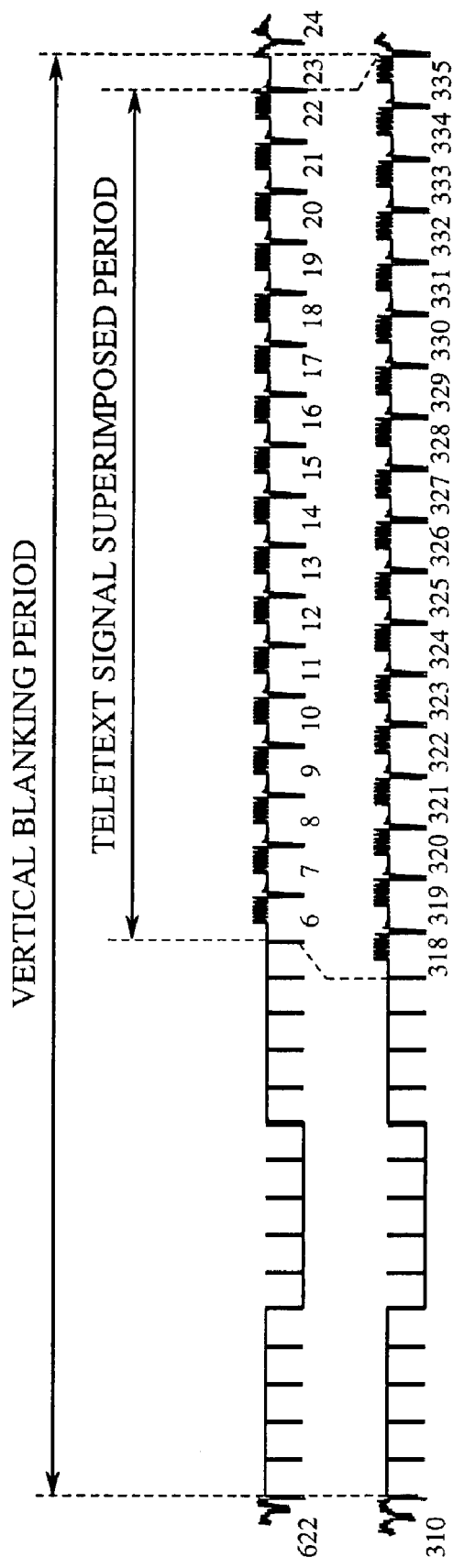
FIG. 7 is a schematic diagram illustrating a vertical blanking period on which a TELETEXT signal is superimposed.
Figure 8:
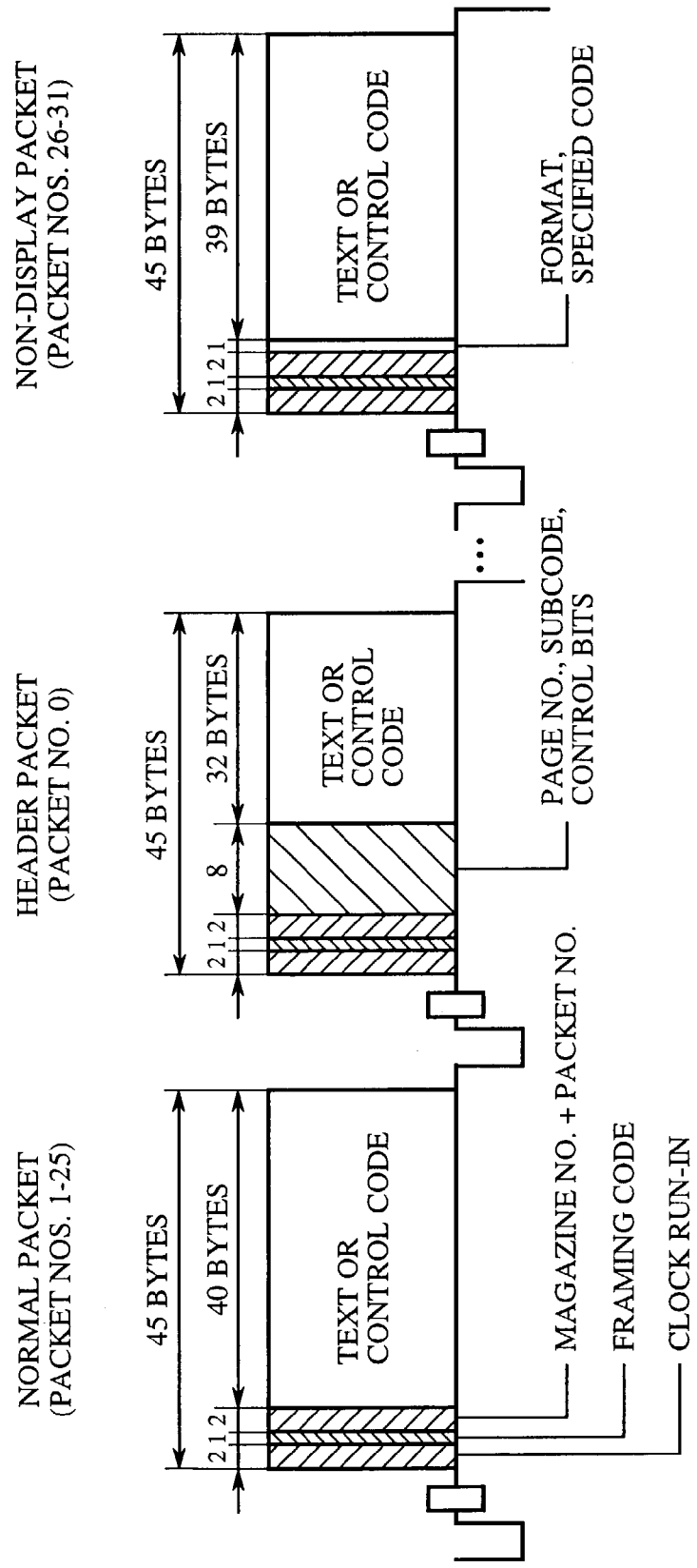
FIG. 8 is a schematic diagram illustrating structures and types of packets of teletext data.
Figure 9:
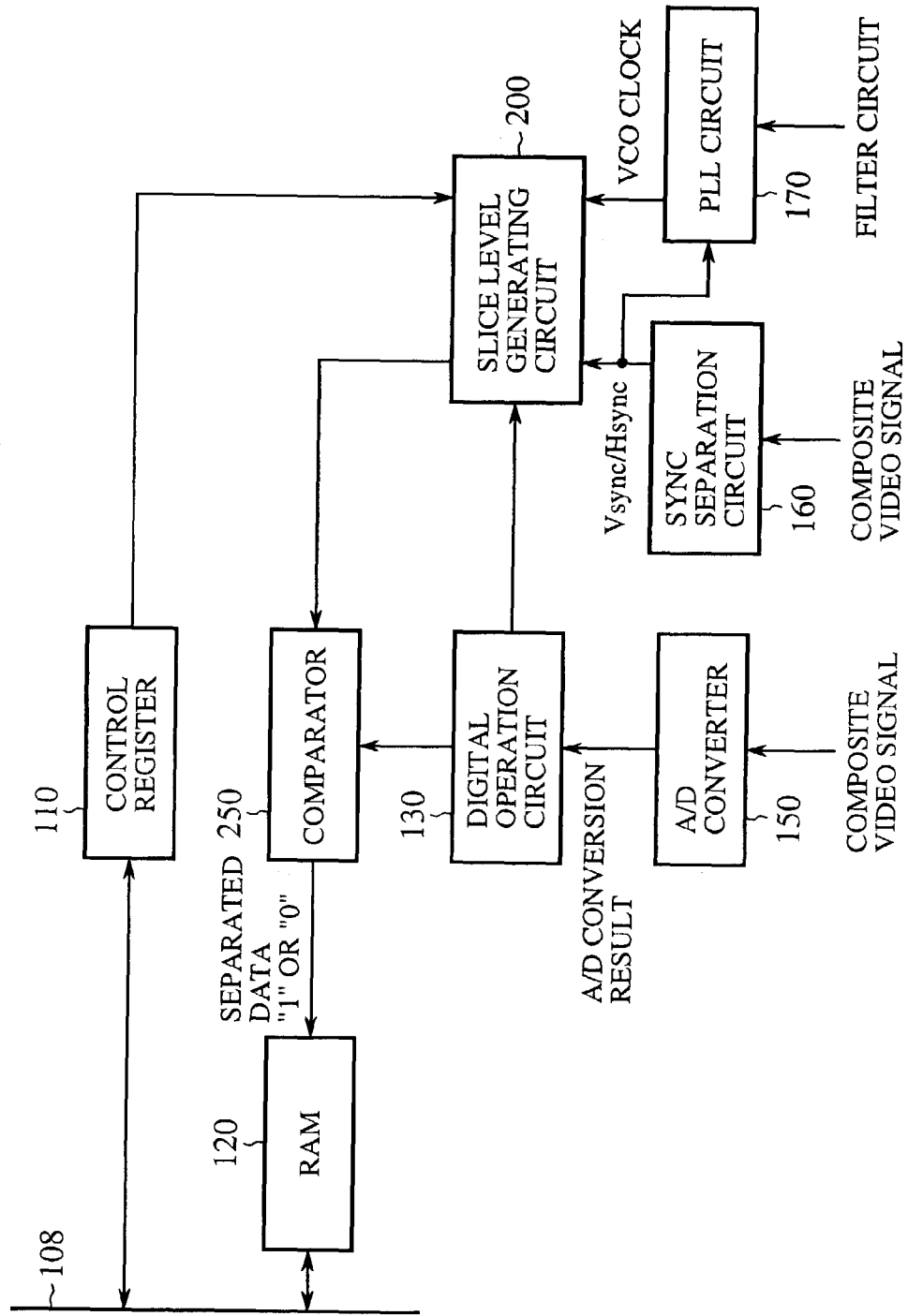
FIG. 9 is a block diagram showing a configuration of a conventional teletext data separation apparatus.
Figure 10:
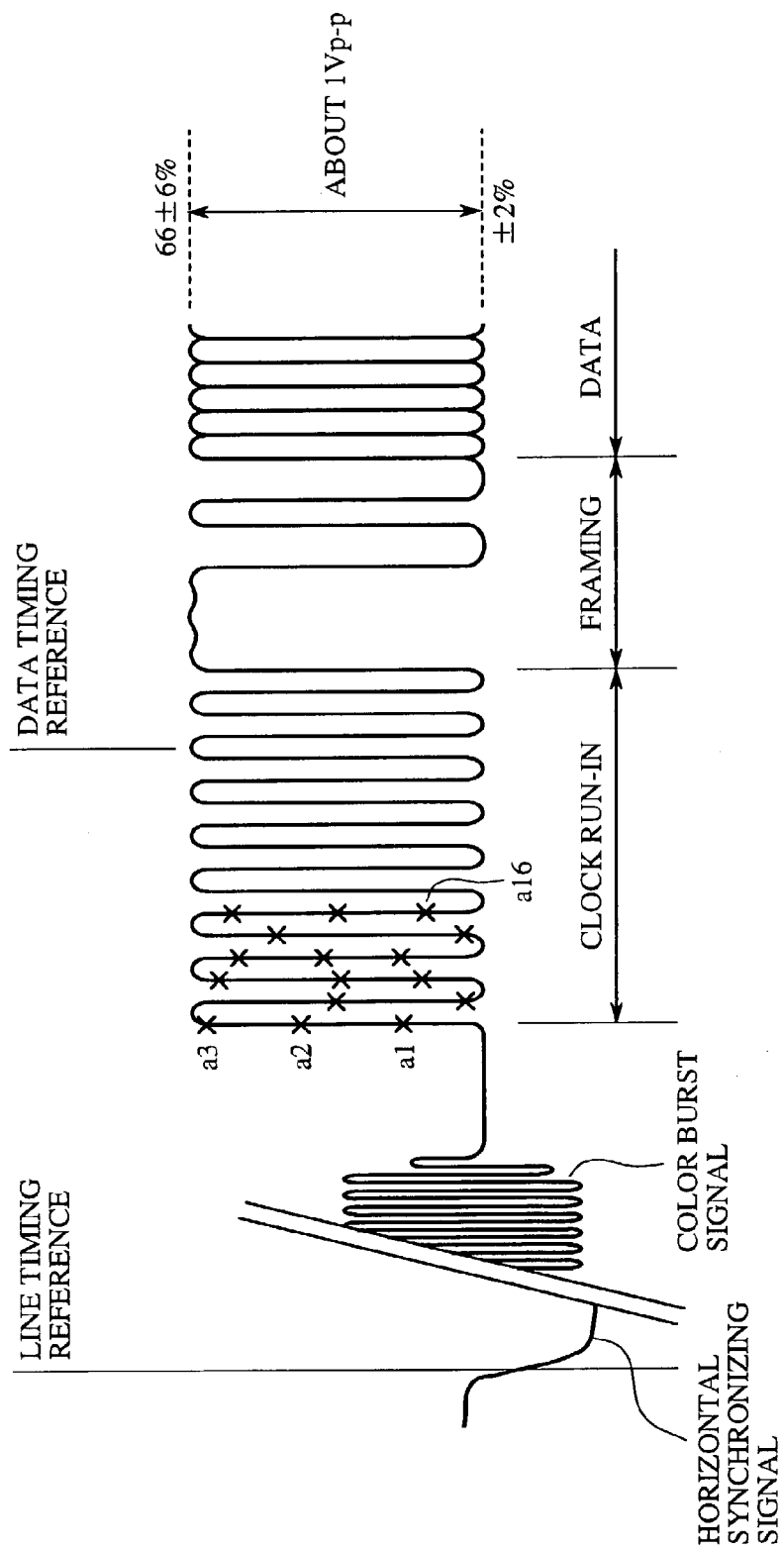
FIG. 10 is a schematic diagram illustrating a composite video signal on which TEXT data is superimposed.

FIG. 6 is a block diagram showing a configuration of embodiments 7 and 8 of the teletext data separation apparatus in accordance with the present invention. In FIG. 6, the same or like portions to those of FIG. 4 are designated by the same reference numerals, and the description thereof is omitted as a rule. In FIG. 6, the reference numeral 151 designates a second A/D converter.

The present embodiment 7 includes a pair of A/D converters 150 and 150', and the sampling data of each of them is used for generating the slice level. The digital operation circuit 131 calculates the average value of the pair of sampling data, which is used for generating the slice level. As a result, the conversion error of the A/D converter can be reduced, and hence the variation in the conversion accuracy due noise or the like can also be reduced, thereby making it possible to generate the appropriate slice level. It is obvious three or more A/D converters can achieve the same advantage.

As described above, the present embodiment 7 is configured such that it includes multiple A/D converters, and uses the average value of the digital data output from the A/D converters to generate the slice level. Thus, the present embodiment 7 can reduce the variation in the conversion accuracy of the A/D converters due to the noise caused by the CPU or power supply. As a result, it offers an advantage of being able to generate the appropriate slice level.

Embodiment 8

Although the A/D converters 150 and 150' sample the teletext data at the same timing in the foregoing embodiment 7, the present embodiment 8 carries out the sampling in a time sharing mode.

Figure 11:
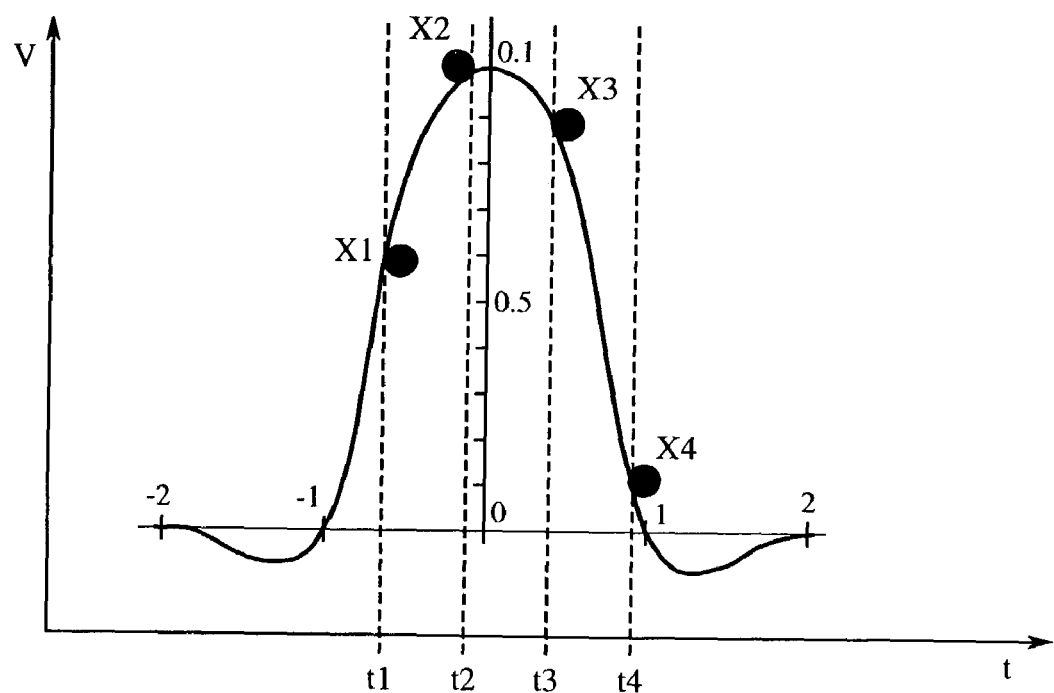
FIG. 11 is a schematic diagram illustrating an example of the sampling of an A/D converter.

Referring to the circuit configuration of FIG. 6, when the A/D converters 150 and 150' carry out the sampling, the first A/D converter 150 samples the teletext data at the timings X1, X2, X3 and X4 as illustrated in FIG. 11. In contrast, the second A/D converter 150' samples at the timings X1', X2', X3' and X4' (not shown) between the sampling points X1 and X2, X2 and X3, X3 and X4, and X4 and X5. Thus interpolating the sampling points can increase the sampling accuracy.

As described above, the present embodiment 8 is configured such that it includes the plurality of A/D converters which operate in the time sharing mode to interpolate the sampling points. As a result, the present embodiment 8 offers an advantage of being able to increase the sampling accuracy of the teletext data, and to generate the appropriate slice level.

What is claimed is:

1. A teletext data separation apparatus comprising:
   at least one A/D converter for converting teletext data superimposed on a composite video signal to digital data;
   a digital operation circuit for generating the teletext data from the digital data;
   an adder and a divider for generating a slice level by sampling the digital data associated with the teletext data by a predetermined number of sampling points;
   an offset register for setting a specified offset value to the slice level in response to the sampling points;
   a slice timing control circuit for controlling said adder and said divider;
   a comparator for comparing the teletext data outputted from said digital operation circuit with the slice level to which the offset value is set to restore original teletext data;
   a register for setting by its register value the number of sampling points of said adder and said divider; and
   means for varying the register value of said register in response to a reception state to increase the predetermined number of the sampling points.

2. The teletext data separation apparatus according to claim 1, wherein said register for setting the number of sampling points is a control register for carrying out ON/OFF control of said slice timing control circuit.

3. The teletext data separation apparatus according to claim 1, wherein the sampling digital data associated with the teletext data is a digital calculation result of the digital operation circuit.

4. The teletext data separation apparatus according to claim 1, wherein the sampling digital data associated with the teletext data is the digital data directly output from said A/D converter.

5. The teletext data separation apparatus according to claim 1, wherein the sampling digital data associated with the teletext data is another digital data obtained within said digital operation circuit.

6. The teletext data separation apparatus according to claim 1, wherein the sampling digital data associated with the teletext data is digital data of another digital operation circuit that carries out correction operation in a manner different from that of said digital operation circuit.

7. The teletext data separation apparatus according to claim 1, wherein said teletext data separation apparatus comprises a plurality of A/D converters for converting the teletext data superimposed on the composite video signal to the digital data, and wherein an average value of the digital data of said plurality of A/D converters is used for generating the slice level.

8. The teletext data separation apparatus according to claim 1, wherein said teletext data separation apparatus comprises a plurality of A/D converters for converting the teletext data superimposed on the composite video signal to the digital data, and wherein said plurality of A/D converters carry out the sampling in time sharing mode to interpolate the sampling points.

9. The teletex data separation apparatus according to claim 1, wherein said register for setting the number of sampling points is a sampling number setting register connected to said adder and divider.

10. The teletext data separation apparatus according to claim 1, further comprising an operation starting position setting register for making variable control of a start timing of the slice level generation by said slice timing control circuit in response to the reception state.

11. The teletext data separation apparatus according to claim 1, further comprising an offset value control circuit for rewriting the specified offset value set by said offset register.

12. The teletext data separation apparatus according to claim 11, wherein said offset value control circuit comprises a register for variably setting the number of sampling points of the slice level used for automatic correction of the offset value, a register for variably setting a target value of the slice level, and a register for variably setting an offset fine adjustment value, to set a variable offset value instead of the specified offset value.

13. A teletex data separation apparatus comprising:
at least one A/D converter for converting teletext data superimposed on a composite video signal to digital data;
a digital operation circuit for generating the teletext data from the digital data;
an adder and a divider for generating a slice level by sampling the digital data associated with the teletext data by a predetermined number of sampling points;
an offset register for setting a specified offset value to the slice level in response to the sampling points;
a slice timing control circuit for controlling said adder and said divider;
a comparator for comparing the teletext data outputted from said digital operation circuit with the slice level to which the offset value is set to restore original teletext data;
a register for setting by its register value the number of sampling points of said adder and said divider; and
means for varying the register value of said register in response to a reception state to increase the predetermined number of the sampling points,
wherein said register for setting the number of sampling points is a sampling number setting register connected to said adder and divider.

14. A teletext data separation apparatus comprising:
at least one A/D converter for converting teletext data superimposed on a composite video signal to digital data;
a digital operation circuit for generating the teletext data from the digital data;
an adder and a divider for generating a slice level by sampling the digital data associated with the teletext data by a predetermined number of sampling points;
an offset register for setting a specified offset value to the slice level in response to the sampling points;
a slice timing control circuit for controlling said adder and said divider;
a comparator for comparing the teletext data outputted from said digital operation circuit with the slice level to which the offset value is set to restore original teletext data;
a register for setting by its register value the number of sampling points of said adder and said divider;
means for varying the register value of said register in response to a reception state to increase the predetermined number of the sampling points; and
an operation starting position setting register for making variable control of a start timing of the slice level generation by said slice timing control circuit in response to the reception state.

15. A teletext data separation apparatus comprising:
at least one A/D converter for converting teletext data superimposed on a composite video signal to digital data;
a digital operation circuit for generating the teletext data from the digital data;
an adder and a divider for generating a slice level by sampling the digital data associated with the teletext data by a predetermined number of sampling points;
an offset register for setting a specified offset value to the slice level in response to the sampling points;
a slice timing control circuit for controlling said adder and said divider;
a comparator for comparing the teletext data outputted from said digital operation circuit with the slice level to which the offset value is set to restore original teletext data;
a register for setting by its register value the number of sampling points of said adder and said divider;
means for varying the register value of said register in response to a reception state to increase the predetermined number of the sampling points; and
an offset value control circuit for rewriting the specified offset value set by said offset register.

16. The teletext data separation apparatus according to claim 15, wherein said offset value control circuit comprises a register for variably setting the number of sampling points of the slice level used for automatic correction of the offset value, a register for variably setting a target value of the slice level, and a register for variably setting an offset fine adjustment value, to set a variable offset value instead of the specified offset value.

* * * * *